United States Patent [19]

Inoue

[11] Patent Number: 4,954,945
[45] Date of Patent: Sep. 4, 1990

[54] PROCESSOR-SELECTION SYSTEM

[75] Inventor: Atsushi Inoue, Yokohama, Japan

[73] Assignee: Kabushiki Kaisha Toshiba, Kawasaki, Japan

[21] Appl. No.: 22,087

[22] Filed: Mar. 5, 1987

[30] Foreign Application Priority Data

Mar. 29, 1986 [JP] Japan .................. 61-72110

[51] Int. Cl.$^5$ .................. G06F 15/16; G06F 9/40
[52] U.S. Cl. .................. 364/200; 364/229.2; 364/230.3; 364/281.3; 364/281.7
[58] Field of Search ... 364/200 MS File, 900 MS File

[56] References Cited

U.S. PATENT DOCUMENTS

| | | | |
|---|---|---|---|
| 4,224,664 | 9/1980 | Trinchieri | 364/200 |
| 4,542,455 | 9/1985 | Demeure | 364/200 |
| 4,543,626 | 9/1985 | Bean et al. | 364/200 |
| 4,564,901 | 1/1986 | Tomlinson et al. | 364/200 |

Primary Examiner—Eddie P. Chan
Attorney, Agent, or Firm—Oblon, Spivak, McClelland, Maier & Neustadt

[57] ABSTRACT

A processor-selection system comprises a plurality of processors connected to each other via bus lines, and a processor-determining section for determining which processor can best execute a task requested by the processor. The respective processor comprises a task table for storing the types of processable tasks and processes performance levels, a flag register for storing a flag showing that the processor is now being occupied, and a comparator for delivering a process-enable signal to the processor-determining section, when a task-processing request made by another processor or processors is accepted, based on information contained in the task table and on the contents of the flag. The processor-determining section determines a suitable processor, in response to the process-enable signal, so that the requested task can be performed.

3 Claims, 4 Drawing Sheets

|  | CONTENTS OF PROCESSING |  |
|---|---|---|
| 1 | MATRIX OPERATION | 5 |
| 2 | VECTOR OPERATION | 6 |
|  |  |  |
| 20 | ADDITION | 7 |
| 21 | PRINT OUTPUT | 3 |

PROCESSOR-SELECTION SYSTEM

BACKGROUND OF THE INVENTION

This invention relates to a system for selecting processors and, in particular, to a processor-selection system for determining job allocation to a plurality of processors, so that they can be operated efficiently.

It is conventional practice to build a computer system by using a plurality of processors. Using this system, various operation processes are performed, on a distribution basis, by the plurality of processors, the inputting and outputting of data also being controlled in the aforementioned way.

In the conventional ordinary multiprocessor system, various tasks are divided into a plurality of processing units and, for each processing unit, a suitable processor is allocated for the task to be executed. It is, therefore, necessary to prepare a plurality of processors for various tasks.

Signal transfer is initially determined relative to a corresponding processor or processors, and it is necessary to execute a predetermined information-processing task in accordance with a program sequence. There is a tendency for the respective processors to have an increasing number of processing functions. Therefore, it is proposed that a plurality of processors incorporated into a multiprocessor system be able to execute the same task. For example, it is current practice to incorporate into a multiprocessor system, processors capable of high-speed operation and equipped with a high-performance printer, and processors having a low-speed of operation and equipped with a low-performance printer. In this case, it is preferable to execute an operation using the high-speed processor, and to print the result of the operation using the high-performance printer. Where, on the other hand, the processor provided with the high-performance printer is occupied with operation processing, it is then preferable to transfer processing information to the processor equipped with the low-performance printer and to print it thereon.

Since the sequence of information-transfer among the processors is predetermined in the conventional system, an additional processor, if present, cannot be utilized for processing, for example, the same task. Furthermore, if the number of processors participating in the system changes, such as a processor being eliminated from or added to the system, then the system cannot execute a job in accordance with a proper processing procedure unless it has been reprogrammed beforehand.

SUMMARY OF THE INVENTION

It is accordingly the object of the present invention to provide a processor-selection system in which a plurality of processors are arranged in accordance with their processing functions and states, and wherein a suitable processor is selected from among the plurality processors, so that the processors can be operated efficiently.

According to the present invention, a processor-selection system is provided which comprises a unit for outputting information, on the types of requested processing tasks and processing performance levels, to a plurality of processors, via bus lines; a task table for storing information representing the types of processable tasks and processing performance levels; a unit for storing a flag showing that the processor is now being occupied; a unit for delivering an output signal representing the acceptance or rejection of a task-processing request made by another processor or processors, on the basis of the information contained in the task table and the contents of the flag; and a unit for determining, in response to process-enable signals from a plurality of processors, a suitable processor for enabling the requested task to be performed.

In this system, the processor-determining unit determines the number of available processors for requested-task processing, in response to the process-enable signal, and, when the number of the available processors is found to be zero, the task-processing performance level is decremented and the task-processing request is made again.

DETAILED DESCRIPTION OF THE PREFERRED EMBODIMENT

Figure 1:
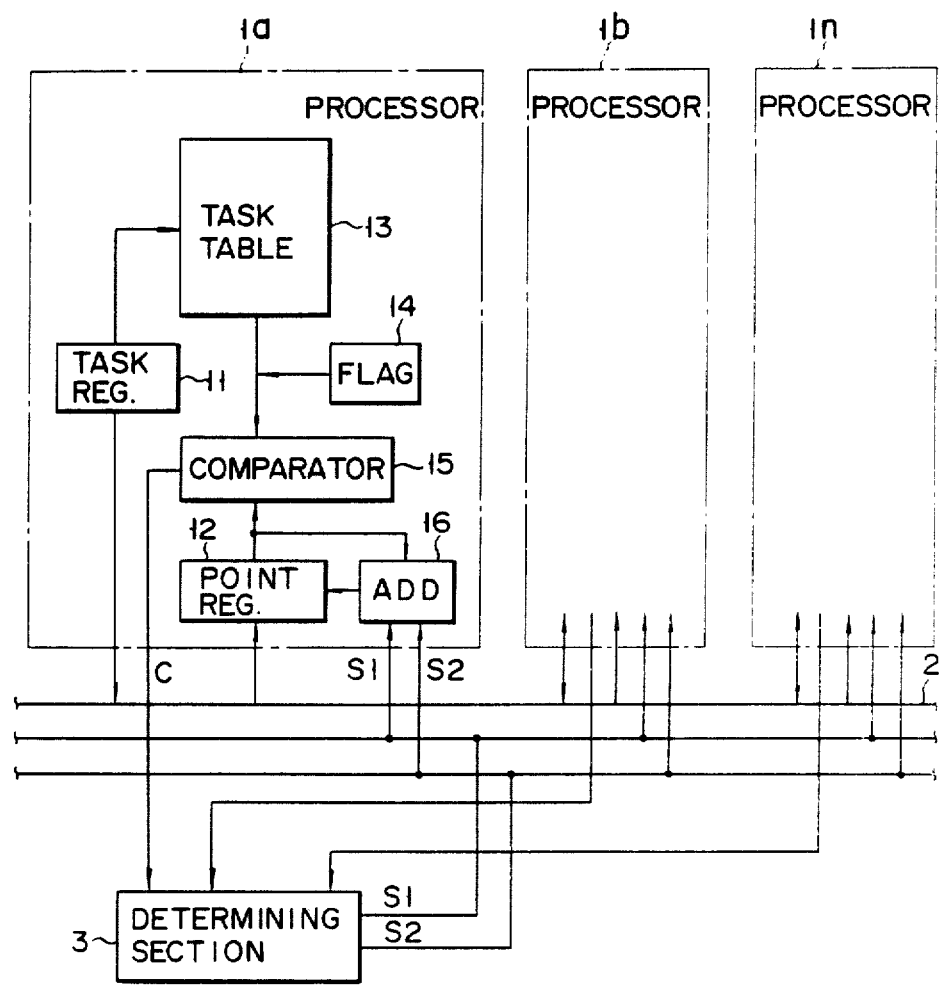
FIG. 1 is a block diagram showing a processor-selection system according to one embodiment of the present invention.

In FIG. 1, a plurality of processors ($1a$, $1b$, ..., $1n$) are connected to each other via bus lines 2. Also connected to bus lines 2 are task register 11 and point register 12. The output terminal of task register 11 is connected to task table 13. Task table 13 stores task-processing functions (the contents of processing) each set to correspond to a particular task number, and processing performance-level information corresponding to the processing functions. For example, task number 1 represents a matrix operation wherein the operation is performed at a processing performance level of 5, i.e., at a medium operation speed corresponding to point number 5. In this connection, it should be noted that the processing performance levels are indicated along a scale of 10 points ranging from a low of 1 to a high of 10. Task number 2 denotes a vector operation whose processing performance level is 6. Similarly, task numbers 20 and 21 represent an addition and printing output, respectively, having processing performance levels of 7 and 3.

The output terminal of task table 13 is connected to comparator 15. Flag register 14, for storing a flag representing whether or not the processor is currently executing a task, is also connected to comparator 15. Point register 12, also connected to comparator 15, stores information for indicating a processing performance level required for a particular task-processing function, and is updated by the output of adder 16.

Figures 2, 3:
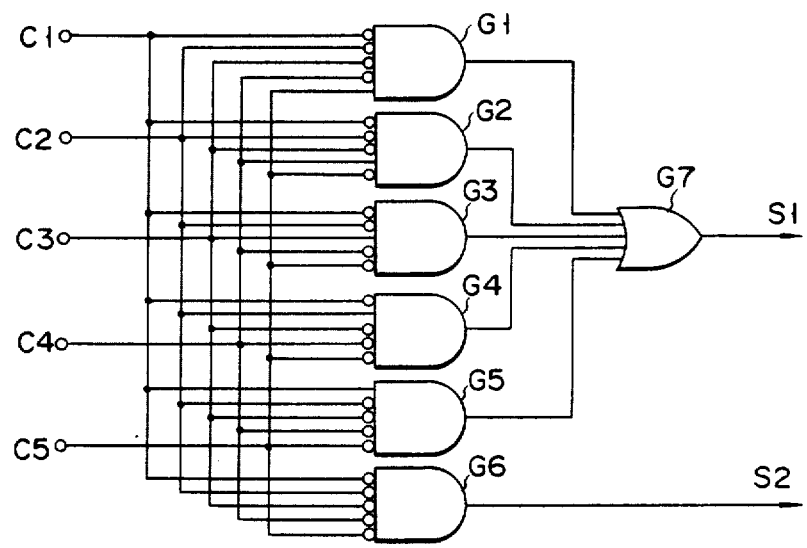
FIG. 2 is a circuit diagram showing the determining section shown in FIG. 1.
FIG. 3 shows the contents of the task table shown in FIG. 1.

The output of comparator 15 is connected to determining-signal output section 3 which is configured as shown in more detail in FIG. 2.

As is shown in FIG. 2, AND gate circuits G1 to G6 are connected to output terminals C1 to C5 of comparator 13. Stated in more detail, terminal C1 is connected to AND gates G1 to G4 and G6, via corresponding inverters, and directly to AND gate G5. Terminal C2 is connected to AND gates G1 to G3, G5 and G6, via corresponding inverters, and directly to AND gate G4. Terminal C3 is connected to AND gates G1, G2 and G4 to G6, via corresponding inverters, and directly to AND gate G3, and terminal C4 is connected to AND gates G1 and G3 to G6, via corresponding inverters, and directly to AND gate G2. Terminal C5 is connected to AND gates G2 to G6, via corresponding inverters, and directly to AND gate G1. AND gates G1 to G5 are connected to OR gate G7, and the output of OR gate G7 and that of AND gate G6 are connected to adder 16, as shown in FIG. 1.

Determining-signal output section 3 generates determining signal S1=L and S2=H when the number of processors available for requested task processing is 0, determining signals S1=H and S2=L when the number of available processors is 1, and determining signals S1=L and S2=L when the number of processors available is more than one.

The operation of the system as shown in FIG. 1 will now be explained below, with reference to FIGS. 4 and 5.

For example, processor 1a generates a task request, at this time, task-number information and information relative to a processing performance for processing a task corresponding to the task number are generated from processor 1a. When, for example, a task number 3 and task information of point number 5 for processing performance are output and stored in task register 11, then, a processor having a task number 3 registered therein is designated from among processors 1a to 1n.

Figure 4:
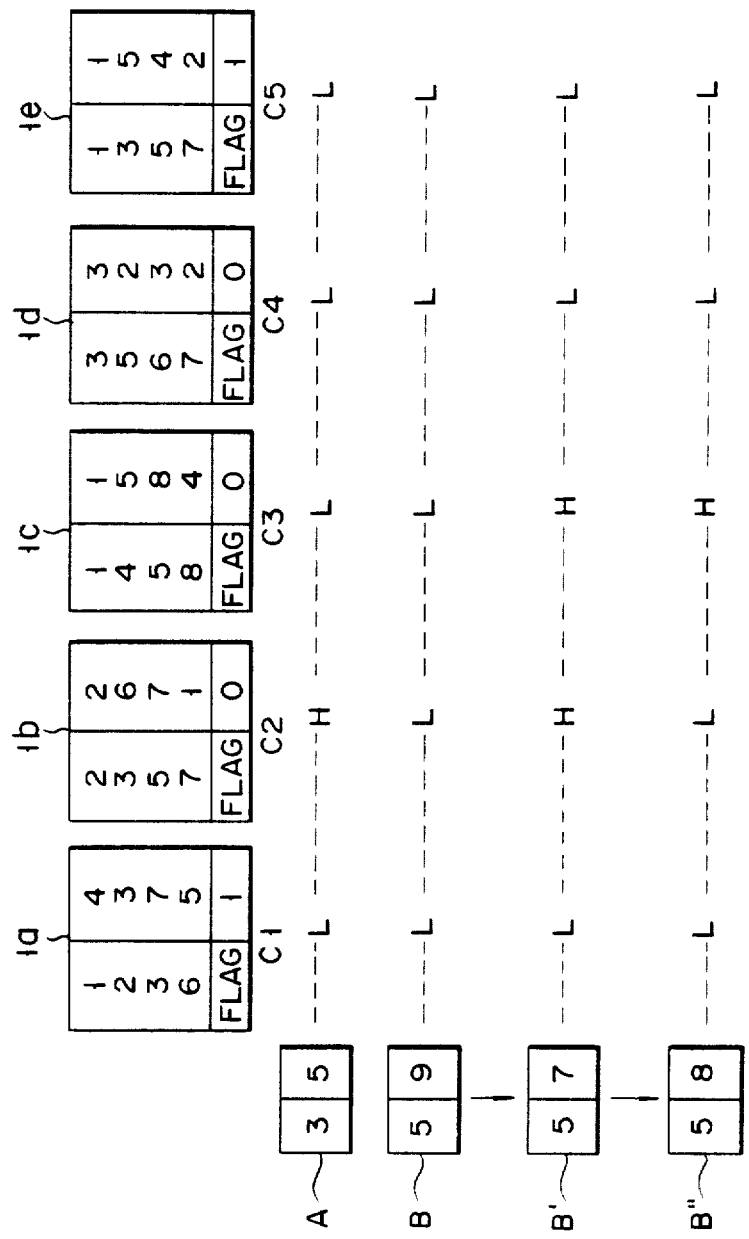
FIG. 4 is a view for explaining a processor-selection operation performed by the processor.
Figure 5:
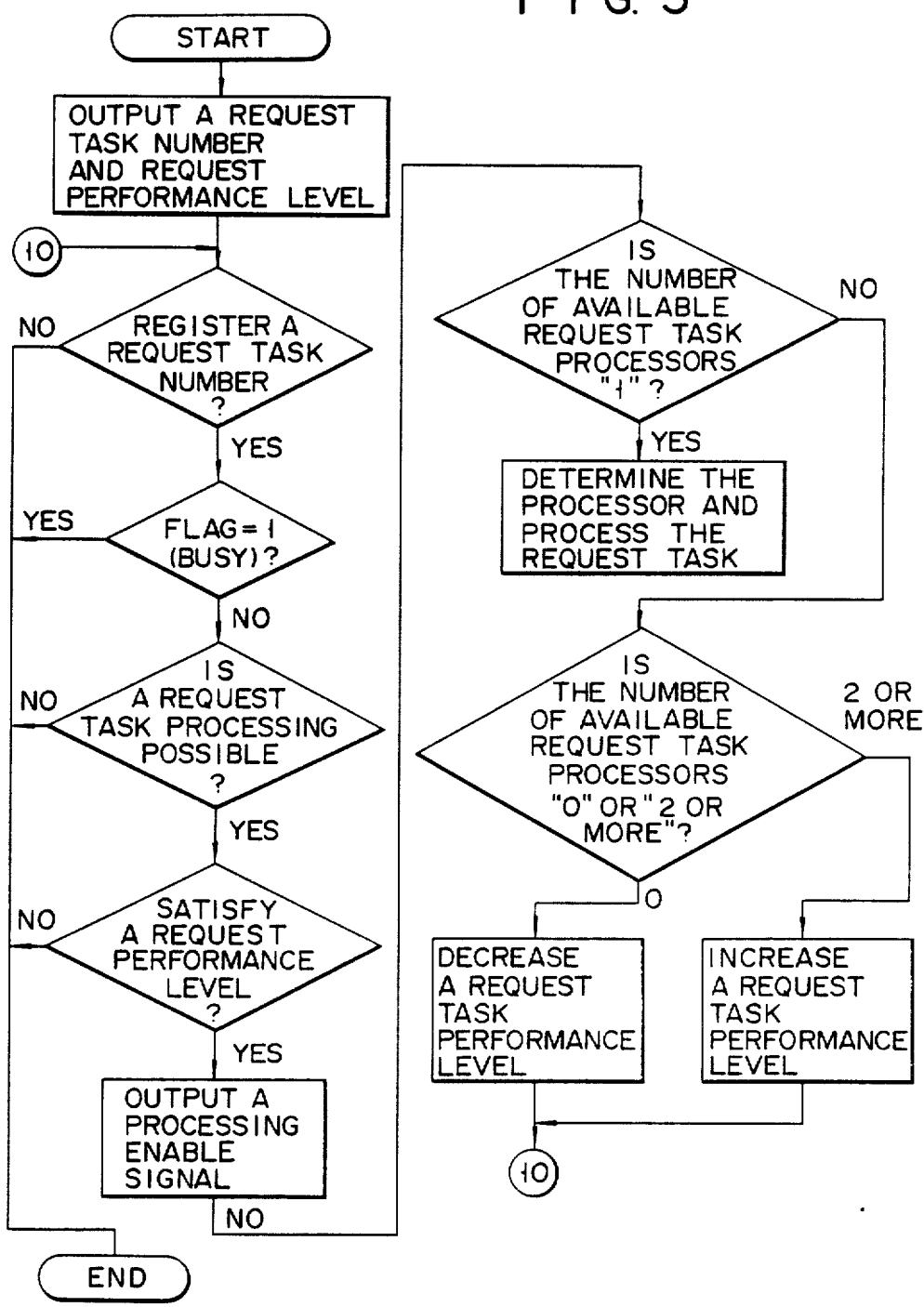
FIG. 5 is a flowchart showing the processor-selection operation steps.

FIG. 4 shows five processors, 1a to 1e. Among these processors, processors 1a, 1b, 1d, and 1e have task number 3 registered in task table 13, and each generates a processing-enable signal. Processor 1c, on the other hand, does not have that specific task number registered therein, and thus does not produce a processing-enable signal.

The flag information of flag registers 14 of processors 1a to 1d is also checked. Since processors 1a and 1e having flag information "1" are found to be busy, these processors are placed in a state wherein they cannot process a request task. On the other hand, processors 1b and 1d are placed in a state where they are available for requested task processing, having been found to be so.

Then, the most efficient processor among those available is selected for the task to be performed, processors 1b and 1d being checked, at this time, regarding their respective processing performance levels. In view of a required processing performance level being over 5, processor 1b, having a processing performance level of 6, is duly selected. Accordingly, a processing-enable signal C2 is output from comparator 15 of processor 1b. When signal C2 is input to determining-signal output section 3, AND gate G4 generates an output 1, and determining signals S1=1 and S2=0 are generated from output section 3. In this way, the number of available processors is found to be 1, on the basis of determining signals (S1=1, S2=0), and processor 1b, having output the processing-enable signal, performs a requested task.

When another task-processing request having a task number 5 and point number 9 for processing performance is generated, processors 1b to 1e, all having task number 5 registered therein, are selected as being available for task processing. Since processor 1e is found to be busy, processors 1b to 1d are determined as being available.

Then, the available processors are rated, by comparator 15, with regard to their respective processing performance levels. Since the requested processing performance point number is 9, it is then determined that there are no available processors present which have a performance level of point number 9 or more. Thus, since all the processing-enable signals entered by comparators 15 of processors 1b to 1d into determining-signal output section 3 are zeroes, determining-signal output section 3 generates determining signals S1=0 and S2=1. That is, since an answer as to whether or not the number of the available processors is 1 is NO (see the flow chart of FIG. 5), it is determined that there are no available processors present.

When the determining signals for determining the available processors is found to be zero, that is, signals S1=0 and S2=1 are supplied to adder 16, the adder subtracts 2 from point number 9 of point register 12, so that the contents thereof are updated as point number 7. At this time, the contents showing the task number and processing performance level become B', as is shown in FIG. 4. As a result, the available processors are determined as having a performance level of point number 7. In this case, processors 1b and 1c are found to have a level higher than point number 7, and thus, processing-enable signals C2 and C3 are output from processors 1b and 1c, respectively.

When signals C2 and C3 are input to determining-signal output section 3, AND gates G1 to G6 all generate a zero signal, that is, output section 3 generates signals S1=0 and S2=0. When determining signals S1=0 and S2=0 are added to adder 16, 1 is added, by adder 16, to the contents (i.e. point number 7, in this case) of point register 12 and, as a result, a task processing request B" is set, so that the contents of point register 12 becomes point number 8.

Since, among processors 1b and 1c, only processor 1c is found to have a level higher than point number 8, it generates a processing-enable signal. In this way, processor 1c is determined as being available, and thus, a corresponding requested task is executed thereby.

According to the aforementioned multiprocessor system, when a task-processing request occurs, the most efficient processor for dealing with the aforementioned task processing request is automatically determined. It is therefore not necessary to determine beforehand a procedure for processing a task on a job-distribution basis, as in the case of the conventional multiprocessor system. According to the present invention, it is possible to perform a processing task flexibly and effectively, with the use of a processor which has been appropriately selected in accordance with the processing state of the system.

According to the multiprocessor system of the present invention, even when the system configuration changes, such as a processor being added to or eliminated from the system, a suitable processor can be selected in accordance with the requested task information, so that a corresponding requested task can be executed. That is, various tasks can be efficiently processed through the maximum effective utilization of the processing functions of the processors constituting the system. It is, therefore, possible to efficiently perform the various tasks requested.

In the aforementioned embodiment, it is possible to stack a plurality of requested tasks in the task register, and to sequentially allocate these tasks to a respective processor. It is also possible for the system to contain, as processing performance information, data relating to the processing time which is required to execute a given task. Even if the time for processing a task is designated, the system is able to adapt itself to performing the necessary processing within the time specified.

Although the maximum processing performance point has been explained as being 10, it can be varied to any appropriate point in accordance with the specification of the system.

The system can be operated in accordance with the processing performance, i.e., the input/output speed in which the task contains a requirement for processing by the processor and one for printing, display, etc., via the I/O device. Furthermore, a master processor may be provided so that a slave processor can be controlled thereby.

What is claimed is:

1. A processor-selection system comprising:
a plurality of processors connected to each other via bus lines, and capable of processing various tasks, said plurality of processors each having a predetermined performance level, generating a task-processing request together with the performance level to the other processors, and responsive to the other task-processing request from the other processors, to output a task-enable signal; and
processor determining means connected to the processors, for receiving the task-enable signal and determining which one of said processors is available for executing a requested task in accordance with the performance level, in response to the task-enable signal from at least one of said processors, and for outputting a level-changing signal for changing a requested task-processing performance level, in response to said processing-enable signal which is selectively output from said processor; and said processing includes means for changing said task-processing performance level, in response to said level-changing signal and wherein said processor-determining means is comprised of means for determining whether or not the number of available processors is 1, 0, or more than 2, by way of a processing-enable signal from the processor, and for outputting a corresponding determining signal; and said level-changing means has a function of lowering the processing performance level for the requested task, in response to the determining signal representing "0", and of raising the processing performance level for the requested task, in response to the determining signal representing more than 2; and
wherein said processors each comprise means for outputting information representing a type of a task to be processed and the performance level; a task table for storing information representing various types of tasks and performance levels required for task processing; flag-storing means for storing a flag showing whether or not the task is now being processed; and means for determining, from the information of said task table and said flag, whether or not a task requested can be performed by another processor, and for outputting, when said task can be performed by another processor, a corresponding processing-enable signal to said processor-determining means;

2. The processor-selection system according to claim 1, wherein said level-changing means comprises storing means for storing a numerical value corresponding to the processing performance level for the requested task, and means for additively and subtractively performing an operation on said numerical value in said storing means, in response to the determining signal of said determining means.

3. The processor-selection system according to claim 1, wherein said determining means generates a first logical signal for lowering the task-processing performance level, in response to a first signal from all processors, indicating that the requested task processing is not possible, and a second logical signal for raising the task-processing performance level, in response to a second signal from at least two of said all processors, indicating that the requested task processing is possible.

* * * * *